United States Patent
Miyazaki

(10) Patent No.: US 7,241,843 B2
(45) Date of Patent: Jul. 10, 2007

(54) RUBBER COMPOSITION FOR TREAD

(75) Inventor: Tatsuya Miyazaki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/446,159

(22) Filed: Jun. 5, 2006

(65) Prior Publication Data

US 2006/0276583 A1    Dec. 7, 2006

(30) Foreign Application Priority Data

Jun. 6, 2005    (JP) ............................. 2005-165497

(51) Int. Cl.
*C08F 8/30* (2006.01)
*C08F 8/34* (2006.01)

(52) U.S. Cl. ............... 525/349; 525/330.4; 525/329.3; 525/331.1; 525/331.8; 525/332.7; 525/348; 525/332.6; 525/343

(58) Field of Classification Search ............. 525/330.4, 525/329.3, 331.1, 331.8, 332.7, 348, 349, 525/332.6, 343
See application file for complete search history.

(56) References Cited

U.S. PATENT DOCUMENTS

| 4,861,842 A * | 8/1989 | Cohen et al. .......... 525/329.3 |
| 2002/0046798 A1 * | 4/2002 | Hahn .................. 156/130.7 |

FOREIGN PATENT DOCUMENTS

| EP | 0 562 750 A2 | 9/1993 |
| EP | 0 562 750 A2 * | 9/1993 |
| EP | 0 751 178 A1 | 1/1997 |
| EP | 0 945 482 A1 | 9/1999 |
| JP | 2001-172432 A | 6/2001 |
| JP | 2002-206035 A | 7/2002 |
| JP | 2002-226629 A | 8/2002 |
| JP | 2002-356102 A | 12/2002 |
| JP | 2003-41056 A | 2/2003 |
| JP | 2005-41974 A | 2/2005 |

* cited by examiner

*Primary Examiner*—Ling-Sui Choi
(74) *Attorney, Agent, or Firm*—Birch, Stewart, Kolasch & Birch, LLP

(57) ABSTRACT

A rubber composition for a tread optimizing a vulcanization speed in a vulcanization step and, further, improving heat aging resistance is provided.

A rubber composition for a tread comprising 20 to 90 parts by weight of silica,
0.5 to 2 parts by weight of (A) a guanidine vulcanization accelerator,
0.1 to 0.5 part by weight of (B) a thiuram vulcanization accelerator,
and 0.5 to 2 parts by weight of (C) a sulfenamide vulcanization accelerator represented by the general formula (1):

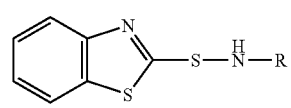

(1)

(wherein R is a linear alkyl group or a branched alkyl group having 1 to 18 carbons),
based on 100 parts by weight of a rubber component.

6 Claims, No Drawings

RUBBER COMPOSITION FOR TREAD

BACKGROUND OF THE INVENTION

The present invention relates to a rubber composition for a tread.

Among parts of a tire, a tread is a part particularly affecting to rolling resistance of a tire, and in order to lower the rolling resistance, compounding silica as a filler for reinforcement is generally carried out.

Since a rubber composition for a tread is easily aged with heat and the like generated by running, it is required to have excellent heat aging resistance.

In the step of vulcanizing the rubber composition for a tread comprising silica, as a vulcanization speed increases to be high, there arise problems such as causing early vulcanization (scorch) due to the influence of a silane coupling agent used in combination with silica and so it is necessary to carry out the vulcanization at an suitable vulcanization speed.

Thus, the rubber composition for a tread comprising silica is required to be excellent in the heat aging resistance and prepared at a suitable vulcanization speed, and in order to satisfy these requirements, particular vulcanization accelerators have been conventionally compounded.

JP-A-2002-226629 discloses a rubber composition for a tread comprising tetrabenzylthiuram disulfide and N-cyclohexyl-2-benzothiazolylsulfenamide as a vulcanization accelerator, but it did not positively compounded with silica, and when silica is used, there has been a problem that silica adsorbs the vulcanization accelerator and, thus, vulcanization is delayed.

SUMMARY OF THE INVENTION

An object of the present invention to provide a rubber composition for a tread optimizing a vulcanization speed in a vulcanization step and, further, improving heat aging resistance is provided.

The present invention relates to a rubber composition for a tread comprising 20 to 90 parts by weight of silica, 0.5 to 2 parts by weight of (A) a guanidine vulcanization accelerator, 0.1 to 0.5 part by weight of (B) a thiuram vulcanization accelerator, and 0.5 to 2 parts by weight of (C) a sulfenamide vulcanization accelerator represented by the general formula (1):

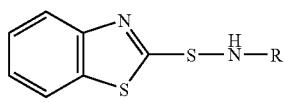

(1)

(wherein R is a linear alkyl group or a branched alkyl group having 1 to 18 carbons), based on 100 parts by weight of a rubber component.

DETAILED DESCRIPTION

The rubber composition for a tread of the present invention comprises rubber components, silica and vulcanization accelerators.

Examples of the rubber components are, specifically, diene rubbers such as a natural rubber (NR), an isoprene rubber (IR), a polybutadiene rubber (BR) and a styrene-butadiene rubber (SBR). Among these, as the rubber component, NR and/or SBR are preferable and NR and SBR are more preferable since the effects such that rolling resistance and tensile property are excellent and, in addition, grip performance and reversion resistance are also excellent can be obtained.

When NR and SBR are used in combination as the rubber components, the amount ratio of NR in the rubber components is preferably 20 to 80% by weight, and the amount ratio of SBR is preferably 20 to 80% by weight. When the amount ratio of NR is less than 20% by weight, and the amount ratio of SBR exceeds 80% by weight, there are tendencies that rolling resistance is large and tensile property is inferior. Further, when the amount ratio of NR is more than 80% by weight, and the amount ratio of SBR is less than 20% by weight, there are tendencies that grip performance is inferior and reversion during vulcanization becomes large.

As silica, silica which is generally used in the tire industry, such as NIPSEAL AQ available from TOSOH SILICA CORPORATION (Nippon Silica Kogyo Co.) can be used.

The amount of silica is at least 20 parts by weight based on 100 parts by weight of the rubber components, preferably at least 25 parts by weight, and more preferably at least 30 parts by weight. When the amount of silica is less than 20 parts by weight, the grip performance is insufficient. Further, the amount of silica is at most 90 parts by weight based on 100 parts by weight of the rubber components, preferably at most 80 parts by weight, and more preferably at most 70 parts by weight. When the amount of silica exceeds 90 parts by weight, viscosity is excellent and processability during a kneading step becomes remarkably difficult.

The rubber composition for a tread of the present invention contains preferably a silane coupling agent in combination with silica. An example of the silane coupling agent is, specifically, bis(3-triethoxysilylpropyl) tetrasulfide. Among these, as the silane coupling agent, bis(3-triethoxysilylpropyl) tetrasulfide is preferable for the reasons that vulcanization is not delayed and crosslinking can be promoted.

The amount of the silane coupling agent is 4 to 10 parts by weight based on 100 parts by weight of silica. When the amount of the silane coupling agent is less than 4 parts by weight, it cannot be coupled with silica by sufficiently interacting with OH groups of the silica, and the rolling resistance tends to be increased. Further, when the amount of the silane coupling agent exceeds 10 parts by weight, viscosity is excellent, processability is poor, and cost thereof tends to be expensive.

In the present invention, the vulcanization accelerators comprise (A) a guanidine vulcanization accelerator, (B) a thiuram vulcanization accelerator, and (C) a sulfenamide base vulcanization accelerator.

Examples of the guanidine vulcanization accelerator (A) are diphenylguanidine, diorthotriguanidine, triphenylguanidine, orthotolylbiguanide, and diphenylguanidine phthalate. Among these, diphenylguanidine is preferable as the guanidine vulcanization accelerator (A) in the viewpoints that a vulcanization speed is accelerated, and further an effect of an inexpensive price can be obtained.

The amount of the guanidine vulcanization accelerator (A) is at least 0.5 part by weight based on 100 parts by weight of the rubber component, preferably at least 0.7 part by weight and more preferably at least 1 part by weight. When the amount of the guanidine vulcanization accelerator (A) is less than 0.5 part by weight, effect of accelerating a vulcanization speed is insufficient. Further, the amount of the guanidine vulcanization accelerator (A) is at most 2 parts by weight based on 100 parts by weight of the rubber component, preferably at most 1.8 parts by weight and more preferably at most 1.5 parts by weight. When the amount of the guanidine vulcanization accelerator (A) is more than 2 parts by weight, it is bloomed on the surface of the rubber, exceeding the solubility limit in the rubber.

Examples of the thiuram vulcanization accelerator (B) are tetramethylthiuram disulfide, tetraethylthiuram disulfide, tetrabutylthiuram disulfide, tetrabenzylthiuram disulfide, dipentamethylenethiuram disulfide, tetrahexylthiuram disulfide, tetramethylthiuram monosulfide, dipentamethylenethiuram monosulfide, dipentamethylenethiuram tetrasulfide, and dipentamethylenethiuram hexasulfide. Among these, tetrabenzylthiuram disulfide is preferable as the thiuram vulcanization accelerator (B) in the viewpoints that rubber compounding can be appropriately vulcanized rapidly and scorch during processing is hardly caused.

The amount of the thiuram vulcanization accelerator (B) is at least 0.1 part by weight based on 100 parts by weight of the rubber component, preferably at least 0.15 part by weight, and more preferably at least 0.2 part by weight. When the amount of the thiuram base vulcanization accelerator (B) is less than 0.1 part by weight, effect of accelerating the vulcanization speed is small. Further, the amount of the thiuram vulcanization accelerator (B) is at most 0.5 part by weight based on 100 parts by weight of the rubber component, preferably at most 0.4 part by weight, and more preferably at most 0.3 part by weight. When the amount of the thiuram vulcanization accelerator (B) is more than 0.5 part by weight, the late vulcanization speed $T_{95}$ is remarkably short nevertheless the initial vulcanization speed $T_{10}$ is not changed, and reversion is a problem.

The sulfenamide vulcanization accelerator (C) is represented by the general formula (1):

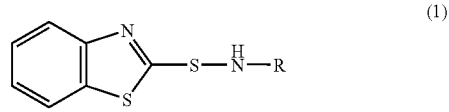

(1)

In the general formula (1), R represents a linear alkyl group or branched alkyl group having 1 to 18 carbons. In particular, R is preferably a branched alkyl group.

Examples of the sulfenamide vulcanization accelerator (C) are specifically N-tert-butyl-2-benzothiazolyl sulfenamide (TBBS) and N-cyclohexyl-2-benzothiazolyl sulfenamide (CBS). Among these, TBBS is preferable as the sulfenamide vulcanization accelerator (C) in the viewpoint that effects of excellent dispersibility in the rubber and stability of vulcanization physical properties can be obtained. The rubber composition for a tread of the present invention comprises the sulfenamide vulcanization accelerator (C) represented by the general formula (1) in place of a cyclic alkyl group containing sulfenamide such as N-cyclohexyl-2-benzothiazolyl sulfenamide which is generally used. The vulcanization speed in the step of vulcanizing the rubber composition is optimized to suppress reversion and the like by substituting a cyclic alkyl group-containing sulfonamide with the sulfenamide vulcanization accelerator (C) represented by the general formula (1) and further using the guanidine vulcanization accelerator (A) and the thiuram base vulcanization accelerator (B) in combination, and further, the rubber composition excellent in heat aging resistance can be obtained.

The amount of the sulfenamide vulcanization accelerator (C) is at least 0.5 part by weight based on 100 parts by weight of the rubber component, preferably at most 0.7 part by weight, and more preferably at most 0.8 part by weight. When the amount of the sulfenamide vulcanization accelerator (C) is less than 0.5 part by weight, crosslinking is not sufficient, thus, the rubber physical property is inferior. Further, the amount of the sulfenamide vulcanization accelerator (C) is at most 2 parts by weight based on 100 parts by weight of the rubber component, preferably at most 1.8 parts by weight, and more preferably at most 1.5 parts by weight. When the amount of the sulfenamide vulcanization accelerator (C) is more than 2 parts by weight, it is bloomed on the surface of the rubber, exceeding the solubility limit in the rubber.

The rubber composition for a tread of the present invention further preferably contains carbon black.

An example of the carbon black is specifically carbon black such as N110 and N220 represented by the ASTM code.

The amount of carbon black is preferably 25 to 45 parts by weight based on 100 parts by weight of the rubber component.

The vulcanization speed can be optimized and further the heat aging resistance can be improved by compounding a specific amount of silica and preferably specific amounts of the rubber component and carbon black, which makes the rubber composition most suitable as the rubber composition for the a tread of a tire.

In the rubber composition for a tread of the present invention, additives such as an antioxidant, zinc oxide, a softening agent, stearic acid and sulfur which are generally used in the rubber industry can be compounded in addition to the rubber component, silica, silane coupling agent, vulcanization accelerator and carbon black.

The rubber composition for a tread of the present invention is suitably used for a tire, in particular, a tread part of a tire. Herein, a tread is referred to a part which is at the outermost part in a tire and contacts with a road surface.

EXAMPLES

The present invention is explained in detail based on Examples, but is not limited thereto.

Various chemicals used in Examples are described in the following.

NR: TSR20

Solution polymerization SBR (S-SBR): SL1552 available from JSR Corporation.

Carbon black 2: SEAST 9 (N110) available from Tokai Carbon Co., Ltd.

Silica: NIPSEAL AQ available from TOSOH SILICA CORPORATION.

Silane coupling agent: Si69 available from Degussa Japan Corporation

Antioxidant: NOCRAC 6C available from OUCHI SHINKO CHEMICAL INDUSTRIAL CO., LTD.

Zinc oxide: ZINC FLOWER NO.1 available from Mitsui Mining & Smelting Co., Ltd.

Aroma oil: PROCESS X140 available from Japan Energy Corporation.

Stearic acid: STEARIC ACID available from NOF Corporation.

Sulfur: SULFUR POWDER available from Tsurumi Chemical Industry Co., Ltd.

Vulcanization accelerator TBBS: NOCCELER NS, (N-tert-butyl-2-benzothiazolylsulfenamide) available from OUCHI SHINKO CHEMICAL INDUSTRIAL CO., LTD.

Vulcanization accelerator CBS: NOCCELER CZ, (N-cyclo-hexyl-2-benzothiazolylsulfenamide) available from OUCHI SHINKO CHEMICAL INDUSTRIAL CO., LTD.

Vulcanization accelerator DPG: NOCCELER D, (diphenylguanidine) available from OUCHI SHINKO CHEMICAL INDUSTRIAL CO., LTD.

Vulcanization accelerator TBZTD: Perkacit TBZTD, (tetrabenzylthiuram disulfide) available from Flexsys Co.

Examples 1 to 6 and Comparative Examples 1 to 6

<Preparation of Unvulcanized Rubber Composition>

The above-described various chemicals except for sulfur and vulcanization accelerators were kneaded according to the compounding amounts described in Table 1 at 150° C. for 5 minutes by a Banbury mixer, sulfur and various vulcanization accelerators were added to the kneaded article, the mixture was kneaded at 80° C. for 5 minutes by an open roll, and an unvulcanized rubber composition was obtained to be used for the vulcanization test below.

<Vulcanization Test>

Vulcanization test was carried out at a measurement temperature of 160° C. using a curelastometer to obtain a vulcanization speed curve in which time and torque were plotted. When the minimum value of the torque on the vulcanization speed curve was represented as ML, the maximum value was represented as MH and difference thereof (MH-ML) was represented as Me, time $T_{10}$ (min) for reaching ML+0.1ME and time $T_{95}$ (min) for reaching ML+0.95ME were read.

It is suitable that $T_{10}$ is 1.7 to 2.7 minutes. When $T_{10}$ is less than 1.7 minutes, it is indicated that rubber scorch is easily caused in the step of extrusion processing. Further, when $T_{10}$ exceeds 2.7 minutes, it is indicated that the initial vulcanization becomes slow and vulcanization time is elongated in the vulcanization step.

Further, it is suitable that $T_{95}$ is 11 to 15 minutes. When $T_{95}$ is less than 11 minutes, it is indicated that reversion is caused in the vulcanization step, torque is lowered due to reversion such as the scission of polymer chains and isolation of bound sulfur, which indicates the physical property of the rubber is lowered. Further, when $T_{95}$ exceeds 15 minutes, it is indicated that the physical property of the rubber is not the best at stopping vulcanization and unevenness of the vulcanization is directly linked to unevenness of the physical property.

(Preparation of Vulcanized Rubber Composition)

A vulcanized rubber composition was prepared by vulcanizing the unvulcanized rubber compositions obtained in the above-described "preparation of unvulcanized rubber composition" by heating at 170° C. for 12 minutes and they were used for the measurement test in the following.

<Rubber Hardness>

Hardness (Hs) of the vulcanized rubber compositions was measured under the condition of a room temperature by using a JIS-A hardness tester. It is suitable that rubber hardness Hs is 64 to 67.

<Tensile Test>

Tensile test was carried out according to JIS K6251 using a No.3 dumbbell test piece comprising each of the vulcanized rubber compositions, and the elongation at break EB of the test piece (before heat aging) were measured. Then, after degradation by thermal oxidation was carried out under the condition of a temperature of 100° C. for 48 hours, the elongation at break EB of the test piece (after heat aging) was respectively measured. The holding ratio (%) of the elongation at break after heat aging was calculated by applying the value of the elongation at break obtained to the following formula.

(Holding ratio (%) of elongation at break after heat aging)=(Elongation at break of test piece after heat aging)/(Elongation at break of test piece before heat aging)×100

Respective test results are shown in Table 1.

TABLE 1

| | Ex. | | | | | | Com. Ex. | | | | | |
|---|---|---|---|---|---|---|---|---|---|---|---|---|
| | 1 | 2 | 3 | 4 | 5 | 6 | 1 | 2 | 3 | 4 | 5 | 6 |
| Amounts (parts by weight) | | | | | | | | | | | | |
| NR | 30 | 30 | 30 | 30 | 30 | 30 | 30 | 30 | 30 | 30 | 30 | 30 |
| S-SBR | 70 | 70 | 70 | 70 | 70 | 70 | 70 | 70 | 70 | 70 | 70 | 70 |
| Carbon black | 32 | 32 | 32 | 32 | 32 | 32 | 32 | 32 | 32 | 32 | 32 | 32 |
| Silica | 45 | 45 | 45 | 45 | 45 | 45 | 45 | 45 | 45 | 45 | 45 | 45 |
| Silane coupling agent | 3.6 | 3.6 | 3.6 | 3.6 | 3.6 | 3.6 | 3.6 | 3.6 | 3.6 | 3.6 | 3.6 | 3.6 |
| Antioxidant | 2.0 | 2.0 | 2.0 | 2.0 | 2.0 | 2.0 | 2.0 | 2.0 | 2.0 | 2.0 | 2.0 | 2.0 |
| Zinc oxide | 2.5 | 2.5 | 2.5 | 2.5 | 2.5 | 2.5 | 2.5 | 2.5 | 2.5 | 2.5 | 2.5 | 2.5 |
| Aroma oil | 25 | 25 | 25 | 25 | 25 | 25 | 25 | 25 | 25 | 25 | 25 | 25 |
| Stearic acid | 2.5 | 2.5 | 2.5 | 2.5 | 2.5 | 2.5 | 2.5 | 2.5 | 2.5 | 2.5 | 2.5 | 2.5 |
| Sulfur | 1.8 | 1.8 | 1.8 | 1.8 | 1.8 | 1.8 | 1.8 | 1.8 | 1.8 | 1.8 | 1.8 | 1.8 |
| Vulcanization accelerator TBBS | 1.1 | 1.5 | 0.7 | 1.1 | 1.1 | 1.4 | 1.5 | — | — | — | 0.3 | 1.9 |
| Vulcanization accelerator CBS | — | — | — | — | — | — | — | 1.1 | 1.5 | 0.7 | — | — |
| Vulcanization accelerator DPG | 1.1 | 0.7 | 1.5 | 1.1 | 1.1 | 1.4 | 0.7 | 1.1 | 0.7 | 1.5 | 1.9 | 0.3 |
| Vulcanization accelerator TBZTD | 0.2 | 0.2 | 0.2 | 0.1 | 0.3 | 0.2 | — | 0.2 | 0.2 | 0.2 | 0.2 | 0.2 |
| Evaluation results | | | | | | | | | | | | |
| $T_{10}$ (min.) | 1.9 | 2.3 | 1.7 | 2.0 | 1.8 | 1.6 | 3.5 | 1.5 | 1.6 | 1.4 | 1.6 | 3.0 |
| $T_{95}$ (min.) | 13.0 | 14.0 | 12.5 | 14.0 | 11.5 | 11.2 | 14.0 | 7.5 | 6.3 | 7.6 | 11.0 | 16.0 |
| Hardness | 65 | 66 | 64 | 64 | 67 | 67 | 65 | 62 | 63 | 63 | 62 | 67 |
| Holding ratio of elongation at break after heat aging (%) | 90 | 92 | 88 | 87 | 94 | 93 | 70 | 90 | 92 | 89 | 81 | 92 |

According to the present invention, it can be provided a rubber composition for a tread optimizing a vulcanization speed in a vulcanization step and, further, improving heat aging resistance by compounding silica and specific amounts of respectively 3 kinds of particular vulcanization accelerators.

What is claimed is:

1. A rubber composition for a tread comprising 20 to 90 parts by weight of silica, 0.5 to 2 parts by weight of (A) a guanidine vulcanization accelerator, 0.1 to 0.5 part by weight of (B) a thiuram vulcanization accelerator, and 0.5 to 2 parts by weight of (C) a sulfenamide vulcanization accelerator represented by the general formula (1):

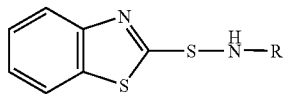
(1)

(wherein R is a linear alkyl group having 1 to 18 carbons or a branched alkyl group having 1 to 18 carbons), based on 100 parts by weight of a rubber component.

2. A rubber composition for a tread which consists essentially of 20 to 90 parts by weight of silica, 0.5 to 2 parts by weight of (A) a guanidine vulcanization accelerator, 0.1 to 0.5 part by weight of (B) a thiuram vulcanization accelerator, and 0.5 to 2 parts by weight of (C) a sulfenamide vulcanization accelerator represented by the general formula (1):

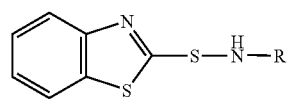
(1)

(wherein R is a linear alkyl group having 1 to 18 carbons or a branched alkyl group having 1 to 18 carbons), based on 100 parts by weight of a rubber component.

3. The rubber composition of claim 1 which further contains 4 to 10 parts by weight of a coupling agent in combination with silica, based on 100 parts by weight of silica.

4. The rubber composition of claim 2 wherein the coupling agent is bis(3-triethoxy-silyl propyl).

5. The rubber composition of claim 2, which further contains 25 to 45 parts by weight based on 100 parts by weight of the rubber component.

6. A tire tread having the rubber composition of claim 1.

* * * * *